Oct. 9, 1951 — M. F. McWILLIAMS, JR — 2,571,047
MIXING VALVE
Filed Aug. 1, 1945
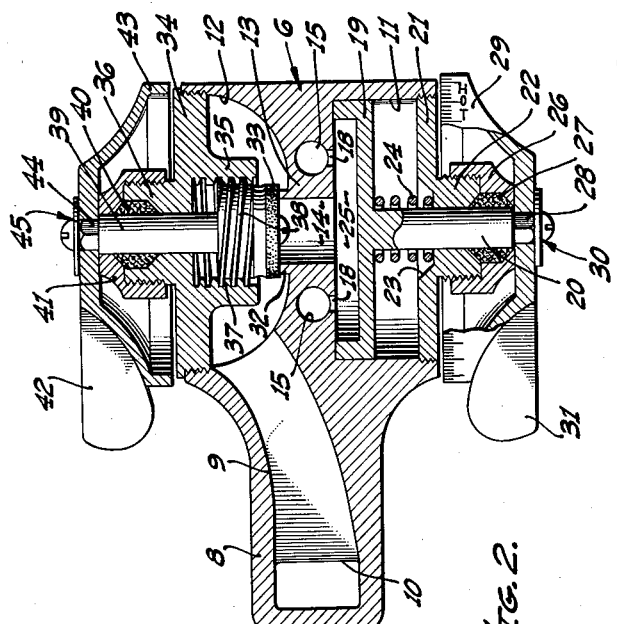
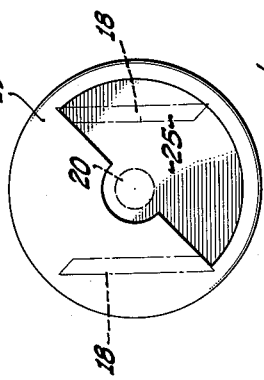
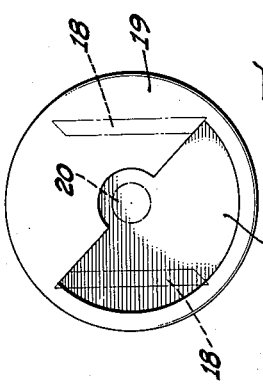
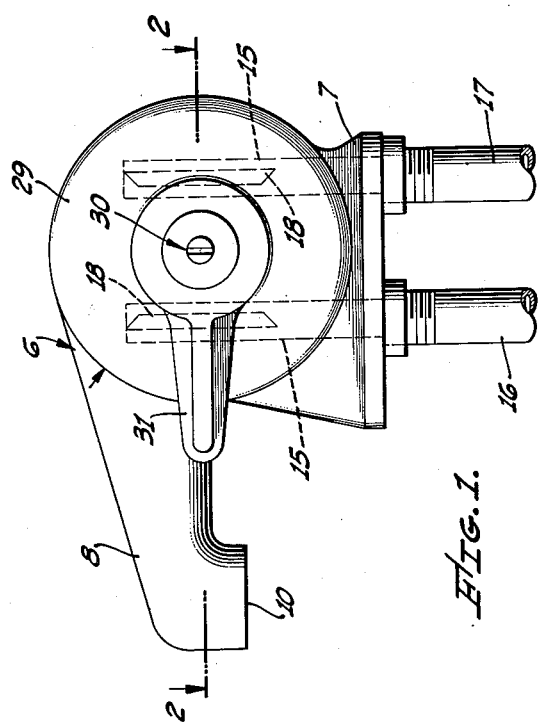
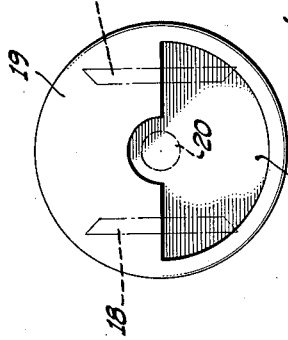
INVENTOR.
MARION F. McWILLIAMS, JR.
BY
Westall & Westall
ATTORNEYS.

Patented Oct. 9, 1951

2,571,047

UNITED STATES PATENT OFFICE 2,571,047

MIXING VALVE

Marion F. McWilliams, Jr., Hollywood, Calif.

Application August 1, 1945, Serial No. 608,261

8 Claims. (Cl. 277—66)

This invention relates generally to mixing valves of the type adapted to control the admission into a mixing chamber of fluids of different temperatures or compositions in predetermined but selectively variable volumetric proportions embodying a separate control for regulating the volume of the total flow of the mixed fluids from a discharge orifice.

In the art prior to my invention, numerous devices for mixing fluids of different properties have been evolved, and apparatus of this type for commercial purposes is in common use. Such equipment, however, where suitable for varying the admixture of fluids of different temperatures to produce a flow of a predetermined specific temperature ordinarily embodies, as inseparable elements, pressure and temperature controls whereby variations in pressure or temperature of either or any of the fluids to be mixed are taken into account in automatically effecting the adjustment of the valves regulating the admission of the various fluids to assure the proportion of each thereof required to obtain the essential uniformity in, or predetermined variable flow of the desired blend. The structural complexity and size of practical embodiments of such prior art mechanisms, as well as their cost of manufacture and distribution, prohibits household or other use thereof where the requirements for mathematical precision of constituent measurements and mechanically-controlled uniformity of the blend is unnecessary.

It is a principal object of the present invention to provide a device embodying manually-actuated valvular means for controlling, respectively, the proportion of liquids of different temperature or composition supplied thereto under pressure from different sources, into a common chamber communicable with a discharge orifice controlled by an independently operable valve by which the volume of the flow emanating from the orifice is regulated.

Another object is the provision of a casing having a pair of inlet ports for the admission of different fluids to be mixed, both ports being controlled by a single valve, operable in response to rotary movement, to coincidentally vary inversely the flow through said respective ports into the casing.

More specifically, an object hereof is to provide a symmetrical fixture comprising a valve body having a base through which inlet passages, for fluids supplied from different sources, extend in combination with a pair of separate valve members disposed on opposite sides of a centrally located mixing chamber and controlled by handles located at either end of a transverse bore within the valve body in which said valves are adapted to operate for controlling the flow through the valve body and determining the proportion of the total flow contributed by the fluid from each source.

Another and highly important object is the provision of a valved fixture embodying means for variably adjusting the total flow of fluid therethrough for ejection from a laterally-projecting spout while maintaining the preadjusted and independently variable proportions of the constituents of the blend.

Other objects and advantages, such for example as economy of manufacture, simplicity of operation, and particularly ease of adjustment of the valve elements in effecting the regulation of the flow and control of the blend of the liquids admitted thereto, as well as compactness and susceptibility to attractive appearance, will be apparent from an examination of the following description read in the light of the accompanying drawings, in which:

Fig. 1 is a side elevation of one embodiment of my invention which is particularly adapted for use in conjunction with household wash stands, sinks and the like;

Fig. 2 is a sectional view taken on line 2—2 of Fig. 1;

Fig. 3 is a plan view of the valve for controlling the blend of the fluids and depicting, in phantom, the elongated ports communicated with the separate inlet passages, the flow through which is controlled by the valve;

Fig. 4 is a plan view of a valve similar to Fig. 3, but illustrating an adjustment in which one port is completely closed and the other fully opened;

Fig. 5 is a third plan view of the valve, illustrating an extreme adjustment directly opposite to that shown in Fig. 4.

Referring to the drawings more in detail, the numerals of which indicate similar parts throughout the several views, 6 designates a generally cylindrical valve body comprising, preferably, a casting, having a flanged base 7 for normally supporting valve body 6 in a horizontal position upon the edge of a wash basin, sink or the like (not shown). Integral with an upper arc of the cylindrical body 6 is a laterally projecting spout 8, disposed symmetrically with respect to the transverse central plane of the valve body. The flow passage 9 within spout 8 is offset and arcuate to communicate with one end of the bore of valve body 6 and terminates at the outer end in a downwardly-directed discharge orifice 10, which, in accordance with the normal disposition of the fixture, is located over the basin or other container into which the water passing through the fixture is to be directed. The bore of valve body 6 is enlarged at each end to form a pair of valve chambers 11 and 12 separated by a thick transverse partition 13. Formed within partition 13 and communicating with each of the valve chambers 11 and 12 is a cylindrical mixing chamber 14. Extending vertically in partition 13 on opposite sides, respectively, of the mixing chamber 14 is a pair of parallel inlet passages 15 opening at their lower ends through base 7. Supply pipes 16 and 17 for hot and cold water, respectively, or other fluids differing in their compositions are connected in the respective inlet passages 15 by suitable fittings. Each inlet passage 15 is communicated with valve chamber 11 through an elongated port 18, flow through which is controlled by a circular rotary valve 19 hereinafter more in detail described.

The valve chamber 11 opening through one side wall of valve body 6 is circular and of uniform diameter from end to end to permit the insertion therein, during assembly, of valve 19 which is of corresponding diameter. The valve comprises a flat disk adapted to fit snugly within the cylindrical wall of chamber 11, normally resting against partition 13 defining the end of the valve chamber. Integral with valve 19 and extending concentrically out of valve chamber 11, is a stem 20 by which the valve is controlled. A retaining disk 21 encircling valve stem 20 at the outer end of chamber 11 comprises a central hub 22, recessed on opposite sides to form a packing box and a spring seat 23, respectively, and an annular rim, the periphery of which is threaded into valve body 6. A helical spring 24 encircling stem 20 between the valve 19 and retaining disk 21 seats in the recess 23 provided therefor in the disk and bears against valve 19 to hold the same in contiguous relation with the end of the valve chamber in which the elongated ports 18 are formed.

The face of valve 19 which abuts against partition 13 is formed with a recess 25, one edge of which coincides with a diameter of the valve and is of a length substantially equal to the distance between the lower edge of one port 18 and the upper edge of the opposed port 18 of the respective inlet passages 15. The edge of recess 25 continues from the ends of the diametrically-aligned edge arcuately on a radius substantially equal to the distance between the center of the valve and the lower end of each of the symmetrically-arranged ports 18. Thus with valve 19 disposed in the position shown in Figs. 2 and 3, i. e., with the recess 25 registering with both ports 18, water or other liquid entering the respective inlet passages 15 is permitted to flow through the ports 18 and into the central mixing chamber 14 of valve body 6 through the recess 25 of the valve.

A packing gland 26 threaded on hub 22 of retaining disk 21 is adapted to compress packing 27 around valve stem 20 to obviate the emission from the casing of liquid from the inlet passages which may bypass valve 19 and enter the chamber in back of the valve. The outermost end of valve stem 20 is square, as indicated at 28, to accommodate a cap 29 having a central opening of corresponding size and shape. Cap 29 is retained in rigid relationship with valve stem 20 by a washer and screw assembly generally indicated by the numeral 30. A handle 31, integral with and radially projecting from cap 29, is provided for transmitting rotary motion through the cap and stem to valve 19 so as to vary the proportion of the liquids admitted from the respective inlet passages 15 into the mixing chamber 14, as will appear.

The valve chamber 12 is formed with an arcuate wall, through one side of which the discharge passage 9 is in open communication. Centrally located and at the bottom of the arcuate wall, an annular valve seat 32, circumscribing the opening into the mixing chamber 14, is formed integral with partition 13 for a valve 33, about to be described. A circular bonnet 34, threaded into the outer portion of the wall of valve chamber 12, is provided with concentric hubs 35 and 36 on either side. The bore within hub 35 is enlarged and formed with internal square threads 37 with which the external threads of a valve body 38 are adapted to engage to transmit axial movement to a valve 33 carried on the end of valve body 38 incident to rotation of the latter. Integral with valve body 38 and concentric therewith is stem 39 which projects through the bore of hub 36 outwardly of valve chamber 12. The bore of hub 36 is enlarged to accommodate packing 40 adapted to be compressed by a gland 41 threaded on hub 36. Rotary motion is transmitted to valve 39 by means of an integral handle 42 and cap 43 of a design and size corresponding to the complementary parts at the opposite side of valve body 6. To this end, the cap 43 is formed with a square opening to closely fit the correspondingly-formed end 44 of valve stem 39. A screw and washer assembly, indicated by the numeral 45, is provided to hold the cap 43 and stem 39 in the described operative relationship.

The operation of the fixture is briefly described as follows: An examination and comparison of Figs. 3, 4 and 5 illustrates the effect of rotative adjustment of valve 19. With the valve positioned as illustrated in Figs. 2 and 3, approximately half of each elongated port 18 is exposed to recess 25 whereby, assuming that the fluids in the respective inlet ports 18 are under equal pressures, an equal amount of fluid flows from each inlet into recess 25 and thence into the mixing chamber 14. Due to the relative disposition of the elongated ports 18 with respect to valve 19 and the contour of recess 25 in the latter, depression of handle 31 is effective to turn the valve in a counter-clockwise direction, as viewed in Figs. 3 to 5 inclusive, so as to shift recess 25 out of communication with the cold water port 18 and into the position illustrated in Fig. 4 wherein the entire hot water port 18 is registered with the recess. This adjustment, as a result of which only hot water will be admitted into the mixing chamber, will be indicated by the alignment of the legend "Hot" with the arrow delineated in the forward upper arc of the valve body adjacent cap 29. Conversely, but in a similar manner, the flow of hot water into valve body 6 may be cut off and the mixing chamber 14 opened to communication with the cold water inlet passage 15 through recess 25 by the elevation of handle 31 which is operative to shift valve 19 to the position illustrated in Fig. 5.

It will be observed that due to the symmetrical arrangement of the inlet ports 18 with respect to the axis of valve 19 and the form of recess 25, the volume of the total flow admitted from the respective inlet openings throughout the operative range of movement of valve 19 from the position illustrated in Fig. 4 to that shown in Fig. 5 will be substantially constant, i. e., movement of valve 19 in either direction effective to reduce the portion of one of the inlet ports 18 exposed to recess 25 opens a corresponding part of the opposite port 18. Thus, assuming equality in the pressure of the liquids supplied from the inlet passages 15, the volume of the flow will be unaffected by the adjustment of valve 19.

The volume of the flow is regulated by valve 33, elevation of handle 42 being effective to withdraw the valve from its annular seat 32, and permits the hot or cold fluid or a blend thereof, depending upon adjustment of valve 19, to flow into the valve chamber 12. It will be appreciated that the arcuate contour of valve chamber 12 facilitates the circulation, and accordingly the mixture of the separate fluids admitted from the respective inlet passages 15. The combined fluids are then directed under the pressure of the fluid in the inlet passages or either thereof into the discharge passage 9 and from the orifice 10 of the spout 8 into the basin or other container with which the fixture is particularly adapted to be associated.

While in the immediately preceding description of the operation of the device it is assumed that the pressure of the fluid directed into the valve body 6 through the respective inlet passages 15 is substantially equal, it will be apparent from the foregoing that manual rotative adjustment of valve 19 is effective to compensate for inequalities in the pressure of the respective fluids to be mixed. If, for example, a particular blend of hot and cold water is desired and the pressure of the cold water is greater than that of the hot water, rotary movement of valve 19 in a counter-clockwise direction to a slightly greater extent that would be required if the pressures in the respective inlet passages were equal will adjust for the difference in pressures and produce a temperature in the total flow equal to the temperature resulting from normal adjustment of valve 19, as hereinabove described, where the pressures are equal. The operation of valve 33 is substantially the same regardless of any variation or inequality in the pressure of the respective fluids, and differences in the volume of the total flow from the mixing chamber 14 which occur as a result of a change in the adjustment of valve 19 where the pressures of the fluid in the respective inlet passages 15 are different, may, where important, be easily compensated by slight readjustment of valve 33.

While I have shown and described a preferred embodiment of my invention, it will be understood that numerous changes in size, proportion, number and design of the respective parts may be made in the interests of economy or to conform more closely with the design of the fixture with which the unit is to be used, and, in particular, the size and disposition of the inlet ports 18 may be varied to provide for additional ports connected with sources of other fluids in order that a desired blend of several different fluids may be obtained, without departing from the spirit of my invention as defined by the appended claims.

What I claim and desire to secure by Letters Patent is:

1. In a mixing valve, a generally circular valve body forming a mixing valve chamber and a discharge valve chamber therein, a partition within said valve body separating said valve chambers and having a pair of inlet passages therein communicating with said mixing chamber through a flat wall thereof, a plate valve within said mixing chamber disposed in contiguous relation with said flat wall to control flow from said inlet passages into said mixing chamber, a handle disposed exteriorly of said valve body and connected to said valve to actuate the latter, said partition having a flow passage therein communicating said valve chambers with one another, a valve in said discharge chamber to control admission of fluid into said discharge valve chamber through said flow passage, and a handle disposed exteriorly of the valve body to actuate said last named valve.

2. In a mixing valve, a base, a generally cylindrical valve body having a mixing valve chamber at one end and a discharge valve chamber at its opposite end, a partition in said valve body between said valve chambers, said valve body having inlet passages extending into said partition, said partition having ports therein communicating said mixing valve chamber with said inlet passages respectively, a mixing valve in said mixing valve chamber in contact with said partition overlying said ports and having a recess therein registerable with said ports, said partition having a circular flow passage therethrough communicating said discharge valve chamber with the recess in said mixing valve, means to rotate said valve to register said recess with, selectively, either or both of said ports and said flow pasage in said partition to communicate one or both of said ports with said discharge valve chamber, and a second valve in said discharge valve chamber to control the flow through said last-named chamber.

3. In a mixing valve, a base, a generally cylindrical valve body having a discharge valve chamber and a mixing valve chamber at opposite ends thereof, a discharge spout extending laterally from said valve body intermediate the ends of the latter having a passage therethrough in open communication with said discharge valve chamber, a partition between said valve chambers having a pair of inlet passages therein and a pair of ports communicating said mixing valve chamber with said inlet passages, respectively, a pair of valves disposed in said valve chambers, respectively, coaxial with said valve body, valve stems connected to said valves, respectively, projecting from opposite ends of said valve body, handles connected to said valve stems and extending radially from the axis of said valve chambers exteriorly of the valve body, said valves being operable, respectively, to control the proportion of fluids admitted into said mixing valve chamber from said respective inlet passages, and to control the flow of fluid from said mixing valve chamber through said discharge valve chamber and spout.

4. In a mixing valve, a cylindrical valve body forming a valve chamber in one end thereof, one wall of said chamber being flat, said valve body having a pair of inlet passages opening exteriorly through said valve body and a pair of ports in said wall communicating said passages, respectively, with said valve chamber, a flat circular valve adapted to engage in contiguous relation said flat wall and having a recess therein to register with approximately one-half of each of said ports, and means to turn said valve to inversely vary the degree of registration of said recess with said ports respectively, the opposite end of said valve body forming a discharge chamber, said wall having an opening therein communicating said chambers, and a valve axially aligned with said first-named valve controlling said opening.

5. In a mixing valve, a generally circular valve body forming in opposite ends thereof a mixing valve chamber and a discharge valve chamber, a wall within said valve body common to both valve chambers and having a pair of inlet passages therein communicating with said mixing chamber through a surface of the latter, a plate valve within said mixing chamber disposed in contiguous relation with said surface to control flow from said inlet passages into said mixing chamber, a handle disposed exteriorly of said valve body and connected to said valve to actuate the latter, said wall having flow passage means therein communicating said valve chambers with one another, a valve in said discharge chamber to control admission of fluid into said discharge valve chamber through said flow passage, a handle disposed exteriorly of the valve body to actuate said last-named valve, and resilient means to urge said plate valve against said wall.

6. In a mixing valve for hot and cold water, a generally cylindrical valve body, a transverse wall dividing said body into a pair of valve chambers, means forming a mixing chamber in said wall between said valve chambers, said valve body having a discharge chamber therein, a pair of inlet passages in said valve body for respective liquids to be mixed, means of communication between said inlet passages and said discharge chamber extending through said valve chambers and said mixing chamber, a pair of opposed coaxially related valves disposed in said valve chambers, respectively, to control the flow from both of said inlet passages through said means of communication, a spout connected to said valve body communicated with said discharge chamber, separate manually-operable controls for said valves to vary the volume of the flow through said spout and determine the proportion of the flow admitted through each of said inlet passages.

7. In a mixing valve for hot and cold water, a cylindrical valve body, a transverse wall in said valve body forming on opposite sides thereof a pair of valve chambers, said wall having an opening therein communicated with both of said valve chambers, a pair of inlet passages in said valve body normally communicated with said opening, a pair of coaxially related valves disposed in said valve chambers, respectively, controlling the flow from said inlet passages through said opening, said valve body having a discharge chamber therein communicated with said inlet passages through said valve chambers and said opening, a spout connected to said valve body communicated with said discharge chamber, separate manually-operable controls for said valves to vary the volume of the flow through said spout and determine the proportion of the flow through each of said inlet passages.

8. In a mixing valve for liquids, a generally cylindrical valve body forming valve chambers in opposite ends thereof, a wall common to both of said valve chambers, said valve body having a discharge chamber therein, separate inlet passages in said valve body, means of communication between said inlet passages and said discharge chamber extending through said valve chambers and said wall, a pair of valves disposed in said valve chambers, respectively, controlling flow through said means of communication, a spout connected to said discharge chamber, and separate controls for said valve to vary the volume of the flow from said inlet passages through said spout and variably determine the proportion of the flow through each of said inlet passages.

MARION F. McWILLIAMS, Jr.

REFERENCES CITED

The following references are of record in the file of this patent:

UNITED STATES PATENTS

| Number | Name | Date |
|---|---|---|
| 938,868 | Hunter | Nov. 2, 1909 |
| 1,336,236 | Johnson | Apr. 6, 1920 |
| 1,527,927 | Schroder | Feb. 24, 1925 |
| 1,856,380 | Foster | May 3, 1932 |